United States Patent [19]

Stockwell

[11] 3,890,006

[45] June 17, 1975

[54] BEET DOOR OPERATOR

[76] Inventor: Orville E. Stockwell, 536 First Ave. South, Greybull, Wyo. 82426

[22] Filed: Dec. 7, 1973

[21] Appl. No.: 422,783

[52] U.S. Cl. ............................. 298/23 D; 105/274
[51] Int. Cl. ................................................ B60j 1/04
[58] Field of Search ............. 298/18, 23 D; 105/274

[56] References Cited
UNITED STATES PATENTS

| | | | |
|---|---|---|---|
| 1,563,830 | 12/1925 | Brown............................ | 105/274 X |
| 1,909,342 | 5/1933 | Galandt .......................... | 298/18 X |
| 2,195,772 | 4/1940 | Farrell ............................ | 298/18 X |
| 3,625,566 | 12/1971 | Suuronen......................... | 298/23 D |

*Primary Examiner*—Robert J. Spar
*Assistant Examiner*—George F. Abraham
*Attorney, Agent, or Firm*—Clarence A. O'Brien; Harvey B. Jacobson

[57] ABSTRACT

A pair of L-shaped levers are provided and pivotally supported from the main frame of a side dump vehicle adjacent the opposite ends of the dump body of the vehicle for oscillation about generally aligned axes extending longitudinally of the vehicle spaced inboard from the longitudinal pivot axis of the side dump body of the vehicle. The pivoted side of the dump body is provided with a side door pivotally supported from the remainder of the body for oscillation about a longitudinal axis extending along the lower marginal edge portion of the door between an upright position closing the adjacent side of the body and an open position with the upper marginal edge portion of the door swung outwardly and downwardly away from the body. The L-shaped levers are disposed at the opposite ends of the dump body and include generally upright long arms whose upper ends are attached to the corresponding end portions of the upper marginal edge portion of the side door by means of adjustable length tension members and horizontally inwardly projecting short arms equipped at their free ends with rollers disposed beneath and rollingly engaged with the undersurface of the opposite end transverse members of the dump body adjacent the floor thereof. As the body is tilted toward a side dumping position side pressure on the door tends to swing the upper marginal edge portion thereof outwardly and downwardly from the remainder of the dump body and the upward swinging of those portions of the opposite end transverse members of the body above the short arm rollers enables the free ends of the short arms of the levers to swing upwardly and thus the upper ends of the upstanding long arms of the levers to swing outwardly, whereby the side door is swung to an open position relative to the remainder of the body. As the dump body is pivoted back toward its lowered position, downward pressure of the opposite end transverse members of the dump body on the rollers carried by the short arms of the levers causes the free ends of the long arms of the levers to swing back toward the center of the body and thus the free marginal edge portion of the door of the body is swung upwardly and inwardly toward the closed position.

10 Claims, 5 Drawing Figures

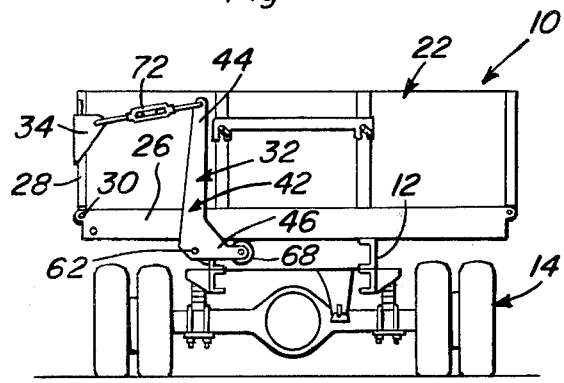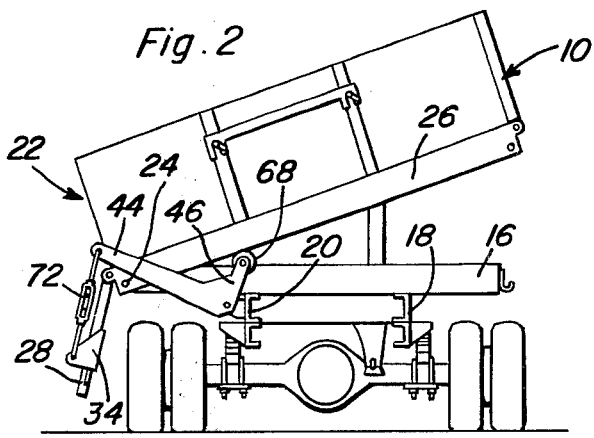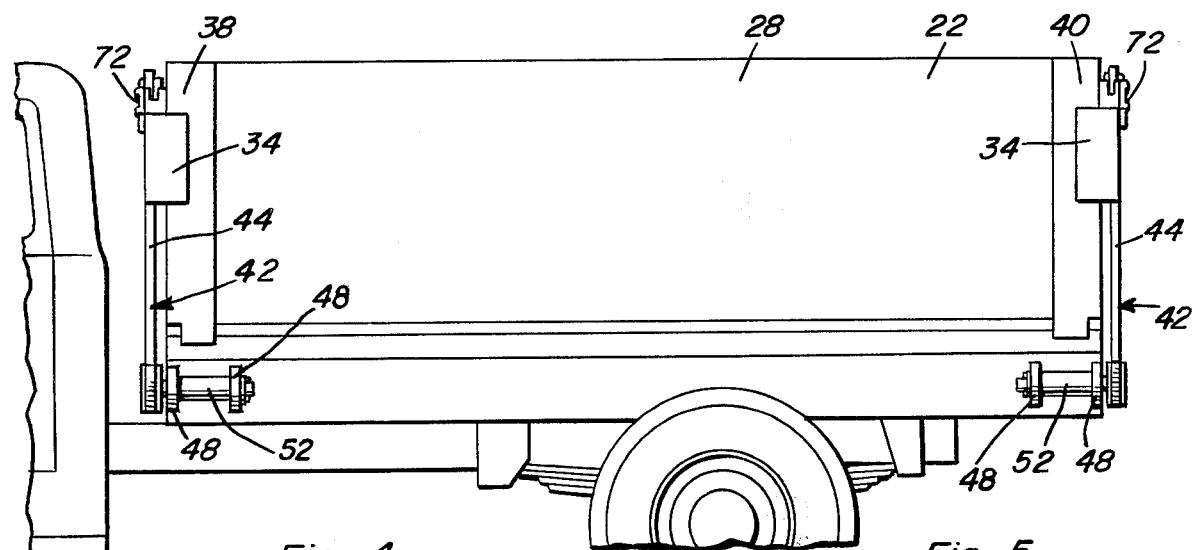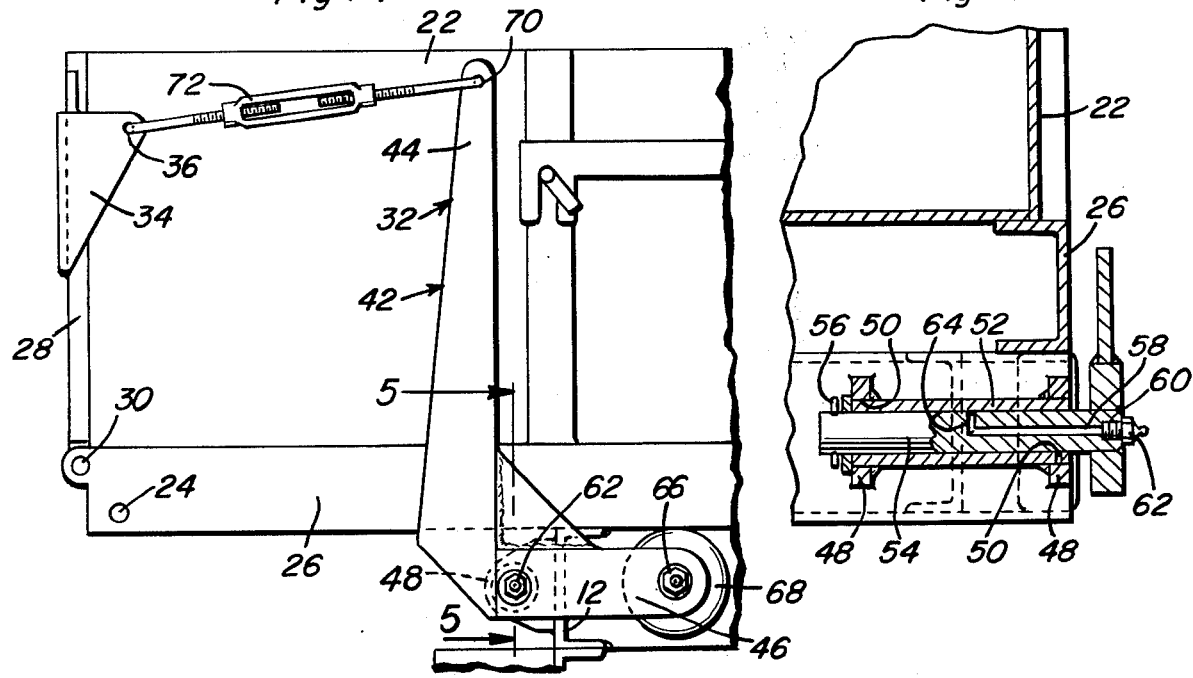

BEET DOOR OPERATOR

Side dump bodies have heretofore been provided with various means for opening and closing the side doors thereof. Some of these previous side door openers have included positive interconnection between the stationary chassis of the side dump vehicle and the openable side door of the dump body. However, these previous side door openers are provided with structure positively connecting the stationary chassis portion of the vehicle with the openable side door and require reasonably complicated structural members and adjustments and thus are expensive to manufacture. Further, other types of side door openers and closers heretofore utilized have required considerable space and extensive mounting procedures.

It is therefore the main object of this invention to provide an apparatus for operating the side door of a side dump body in a manner such that the side door of the body may be opened as a result of the body being tilted to a dumping position and closed as a result of the body being swung from the dumping position to the upright transport position.

Another object of this invention, in accordance with the immediately preceding object, is to provide a side door operator which may be mounted from the stationary main chassis of a side dumping vehicle and operatively connected to the side dumping body and openable door of the side dumping body by simplified structure.

Another important object of this invention is to provide a side dumping body door operator which may be readily mounted upon a side dumping vehicle in a manner requiring little operating space.

Still another object of this invention is to provide an operator for the side door of a side dumping body and which includes a single adjustment for determining the final closed position of the side door of the side dumping body as the side dumping body is swung from a dumping position back to the upright transport position.

A final object of this invention to be specifically enumerated herein is to provide a side dumping body side door operator in accordance with the preceding objects and which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

FIG. 1 is a rear elevational view of a side dumping vehicle with the side door operator of the instant invention operatively associated therewith, the side dumping body being in the transport position and the side door of the body being illustrated in a closed position;

FIG. 2 is a rear elevational view similar to FIG. 1 but with the side dumping body in a dumping position and the door operator functioning to support the side door of the body in an open position;

FIG. 3 is a side elevational view of the vehicle illustrated in FIGS. 1 and 2 and illustrating the manner in which companion components of the side door opener are mounted at opposite ends of the side dumping body;

FIG. 4 is a fragmentary enlarged rear elevational view of the upper left-hand portion of the assemblage illustrated in FIG. 1;

FIG. 5 is a fragmentary vertical sectional view taken substantially upon the plane indicated by the section line 5—5 of FIG. 4.

Referring now more specifically to the drawings the numeral 10 generally designates a side dumping vehicle of the truck type including a main chassis 12 from which supporting wheel to running gear referred to in general by the reference numeral 14 is supported. The main chassis 12 includes front and rear transverse members 16 bridging the front and rear ends of the opposite side longitudinal frame members 18 and 20 of the chassis 12. The side dumping vehicle 10 includes a side dumping body referred to in general by the reference numeral 22 and pivotally supported at its front and rear ends from the left-hand ends of the transverse members 16 as at 24 for swinging between an upright transport position such as that illustrated in FIG. 1 of the drawings and a tilted side dumping position such as that illustrated in FIG. 2. It is to be understood that any suitable force means (not shown) may be utilized to swing the body 22 from the transport position thereof illustrated in FIG. 1 of the drawings to the side dumping position thereof illustrated in FIG. 2 of the drawings.

The side dumping body 22 includes front and rear transverse members 26 and a side door 28 pivotally supported from the left-hand ends of the front and rear transverse members 26 as at 30. In this manner, the door 28 may be swung from the upright closed position illustrated in FIg. 1 of the drawings to the open position with the upper marginal edge portion of the door 28 swung outwardly and downwardly as illustrated in FIG. 2.

The door operator of the instant invention is referred to in general by the reference numeral 32 and includes a pair of L-shaped brackets 34 apertured as at 36 and secured to the front and rear upstanding edge portions 38 and 40 of the door 28 in any convenient manner such as by welding. The operator 32 additionally includes a pair of L-shaped levers referred to in general by the reference numeral 42. Each lever 42 includes a substantially upright long arm 44 and a horizontally inwardly projecting short arm 46. A pair of longitudinally spaced brackets 48 are secured to the outer side of the longitudinal member 20 at its opposite ends in any convenient manner such as by welding. The brackets for mounts 48 have aligned bores 50 formed therethrough and a journal sleeve 52 has its opposite ends secured in the bores 50 of each pair of brackets 48, the journal sleeves 52 being substantially aligned.

Each of the L-shaped lever arms 44 has one end of a pivot shaft 54 secured therethrough at the juncture of the arms 44 and 46 and the outwardly projecting end portion of each pivot shaft 54 is journaled in and secured through the corresponding journal sleeve 52 by means of a removable keeper 56. In addition, each pivot shaft 54 is provided with a blind bore 58 opening endwise outwardly of the pivot shaft end secured through the corresponding L-shaped lever 42. The outer end of bore 58 is provided with an enlarged counterbore 60 in which a grease fitting 62 is secured and the inner end of each bore 58 opens into a radial bore 64 by which lubricating fluid introduced into the bore 58 through the fitting 62 may be forced between the opposing journal surfaces of the sleeve 52 and pivot shaft 54.

The free end of the short arm 46 of each lever 42 has a journal shaft 66 secured therethrough in any convenient manner and one end of each journal shaft 66 projects inwardly under the corresponding transverse member 26 and has a roller 68 journaled thereon, the upper periphery of each roller 68 being rollingly engaged with the undersurface of the corresponding transverse member 26. In addition, the upper free end of each long arm 44 is apertured as at 70 and an adjustable length turnbuckle-type tension member has its opposite ends secured through each pair of corresponding apertures 36 and 70.

In operation, as the body 22 is tilted from the position thereof illustrated in FIG. 1 of the drawings to the position thereof illustrated in FIG. 2, the portions of the transverse members 26 overlying the rollers 68 swing upwardly and thereby enable the free ends of the short arms 46 to swing upwardly and the free ends of the long arms 44 to swing outwardly. The opposite ends of the turnbuckle-type tension member 72 are rotatably secured through the apertures 36 and 70 and as the upper ends of the long arms 44 swing outward the upper marginal edge portion of the door 28 is allowed to swing outwardly and downwardly toward the open position thereof illustrated in FIG. 2. Of course, side pressure of the load within the body 22 tends to swing the door 28 from the closed position of FIG. 1 to the open position of FIG. 2. After the body 22 has been unloaded and the body 22 is allowed to swing from the dumping position thereof illustrated in FIG. 2 back toward the transport position thereof illustrated in FIG. 1, those portions of the transverse members 26 above the rollers 68 bear downward on the latter causing the free end of the short arms 46 to swing downwardly and the free end of the long arm 46 to swing upwardly and inwardly. Of course, as the free ends of the long arms 44 are swung upwardly and inwardly the free swinging edge portion of the door 28 is swung upwardly and inwardly toward the closed position thereof illustrated in FIG. 1.

Inasmuch as the tension members connecting the free ends of the long arms 44 to the brackets 34 comprise adjustable length turnbuckles, any necessary adjustments to be made in the door operator may be carried out at the turnbuckle 72.

The door operator 32 may be easily detached from the body and frame by merely removing or installing cotter pins 56 or similar fastening devices. This enables the body to be more effectively used in hauling non-dumpable loads such as machinery or the like. Also, as illustrated in FIGS. 1 and 2, the door operator 32 is positioned in laterally spaced relation to an end gate such as a livestock gate or the like thereby enabling unobstructed access thereto for use of the livestock gate in a conventional manner.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed is:

1. In combination, a side dumping vehicle of the type including a pair of opposite side longitudinal beams interconnected at points spaced therealong by means of transverse members extending therebetween, a load bed including a bottom wall interconnecting opposite side and end walls pivotally supported at opposite ends adjacent one of its side walls from corresponding ends of said transverse members for swinging of said load bed about aligned axes between an upright transport position and an inclined dumping position with the other side of said load bed elevated relative to said one side, the side wall extending along said one side of said load bed comprising a door and being pivotally supported from the latter for swinging of said door between a closed upstanding position and an open position with the upper marginal edge of said door swung outwardly and downwardly, an operator for said door, said operator including a pair of L-shaped levers including long upstanding arms and short horizontal arms, pivot means pivotally supporting said levers, at the juncture of the long and short arms thereof, from opposite end portions of the longitudinal beam adjacent said one side of said load bed for oscillation about generally aligned axes extending longitudinally of said load bed and with said short arms projecting toward the remote side of said load bed and said long upstanding arms spaced inwardly from the adjacent ends of said door, a pair of elongated tension members each having one end pivotally connected to the free end of a corresponding end of said door at a point spaced above the axis of oscillation of said door and having the opposite end connected to the free end of the long arm of the lever associated therewith, the free end portions of said short arms having roller means journaled therefrom and displaced laterally outwardly therefrom to a position underlying the corresponding end marginal portion of said load bed with the upper peripheral portions of said rollers rollingly engaged with the adjacent undersurface portions of said end marginal edge portions of said load bed.

2. The combination of claim 1 wherein said tension members comprise adjustable length turnbuckles.

3. The combination of claim 1 including gusset plates secured between the adjacent base ends of the arms of said levers.

4. The combination of claim 1 wherein said pivot means includes a pair of pivot shafts secured through said levers at the junctures of the arms thereof and disposed generally normal to the planes containing said levers, the adjacent ends of said pivot shafts projecting outwardly of said levers towards each other and being journaled in journal sleeves supported from the corresponding end portions of said longitudinal beam adjacent said one side of said load bed.

5. The combination of claim 4 wherein each end portion of the last mentioned beam includes a pair of longitudinally spaced brackets through which the opposite ends of the corresponding sleeve are secured.

6. The combination of claim 4 wherein said brackets are carried by and project outwardly of the outer side of said last mentioned beam.

7. The combination of claim 4 wherein the remote ends of said pivot shafts have longitudinal bores formed therein opening outwardly of said remote ends, the inner ends of said longitudinal bores opening into the inner ends of radial bores formed in said pivot shafts, the outer ends opening outwardly of said pivot shafts intermediate the opposite ends of the corresponding sleeves, and grease fittings secured in the remote ends of said longitudinal bores.

8. In combination, a side dumping vehicle of the type including a frame having opposite side portions, a load bed including a bottom wall having opposite ends and sides and at least one upstanding side wall extending along one side of said bottom wall and pivotally supported for swinging of said side wall about a first horizontal axis extending longitudinally of said one side of said bottom between a closed upstanding position and an open position with the upper marginal edge of said side wall swung outwardly and downwardly relative to the remainder of said load bed, means pivotally supporting said load bed from said frame for swinging about a second axis generally paralleling said first axis between an upright transport position and an inclined dumping position with the other side of said load bed elevated relative to said one side, operator means for said side wall including L-shaped lever means with long upstanding and short horizontal arms, pivot means pivotally supporting said lever means, at the juncture of the long and short arms thereof, from said one side of said frame for oscillation about a third axis extending longitudinally of said load bed with the short arm projecting toward the other side of said load bed and the long upstanding arm spaced inwardly of said side wall and outwardly of one end of said load bed, an elongated tension member having one end pivotally connected to the free swinging edge portion of said wall at a point spaced above the axis of oscillation of said side wall and having the other end connected to the free end of the long arm, the free end of said short arm including roller means journaled therefrom and rollingly engaged with an adjacent guide surface integral with and extending transversely of said load bed.

9. The structure as defined in claim 8 wherein said body also includes an end wall provided with an openable gate, such as a livestock gate, said operator means being disposed in spaced relation to the end gate to enable unobstructed access thereto.

10. The structure as defined in claim 8 wherein said operator means is removably attached to the frame and side wall to enable removal thereof to facilitate utility of the vehicle body for hauling non-dumpable loads, such as machinery and the like.

\* \* \* \* \*